No. 693,793. Patented Feb. 18, 1902.
C. FRANCKE & H. SCHWABACHER.
SPEED RECORDER AND REGISTER FOR VEHICLES.
(Application filed Mar. 18, 1901.)
(No Model.) 4 Sheets—Sheet 2.
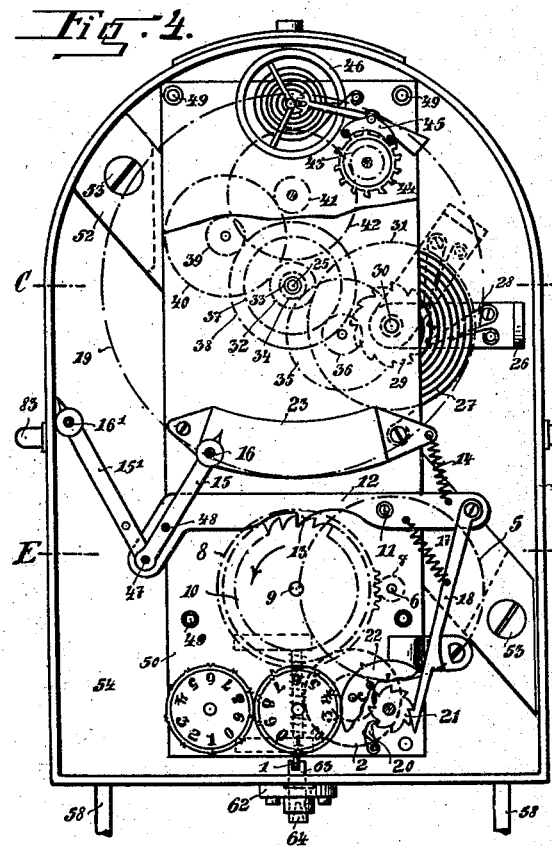
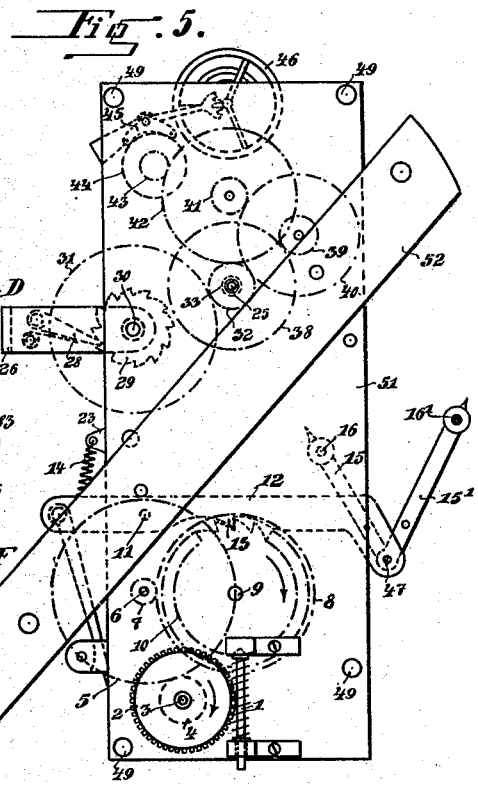
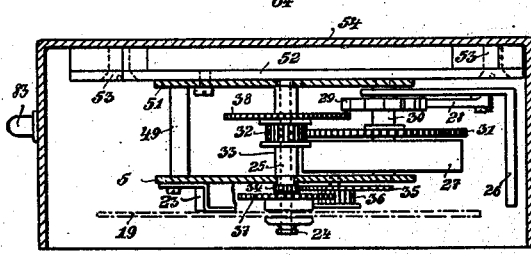
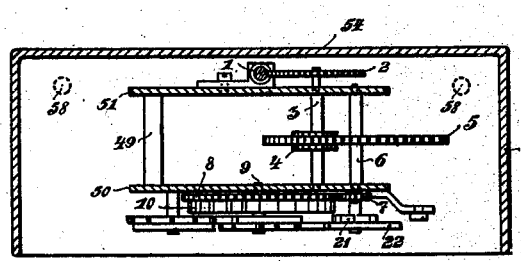
Inventors
Carl Francke
Heinrich Schwabacher

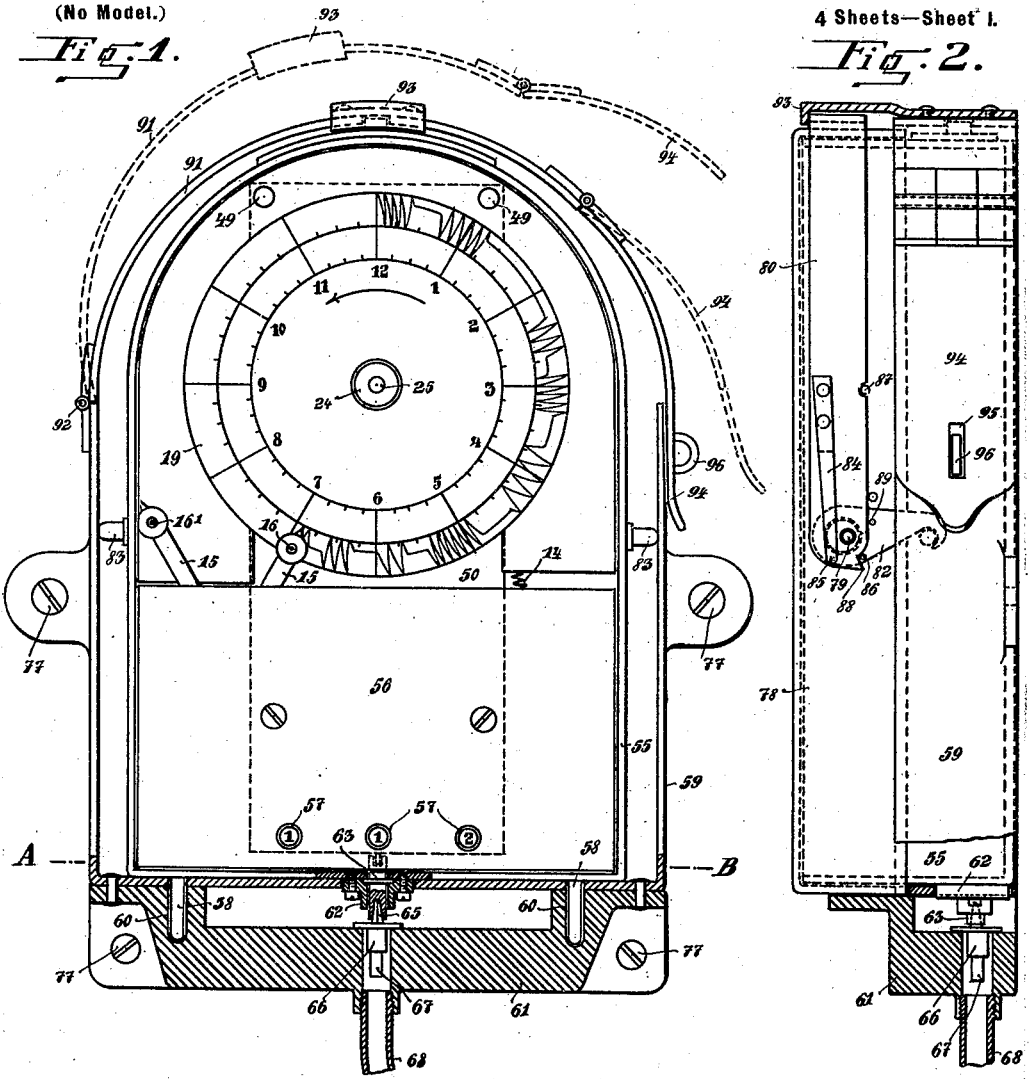

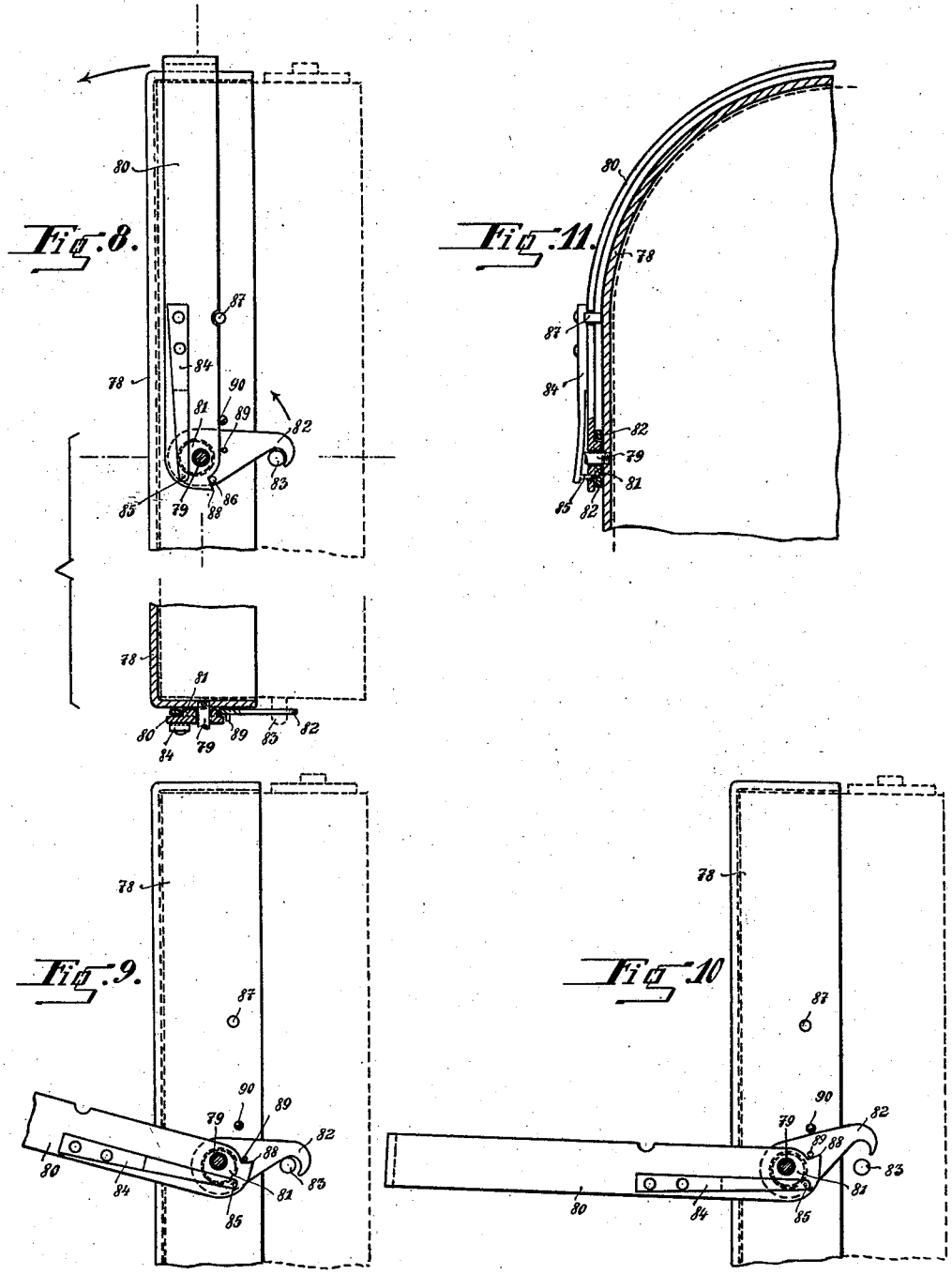

No. 693,793. Patented Feb. 18, 1902.
C. FRANCKE & H. SCHWABACHER.
SPEED RECORDER AND REGISTER FOR VEHICLES.
(Application filed Mar. 18, 1901.)
(No Model.) 4 Sheets—Sheet 4.
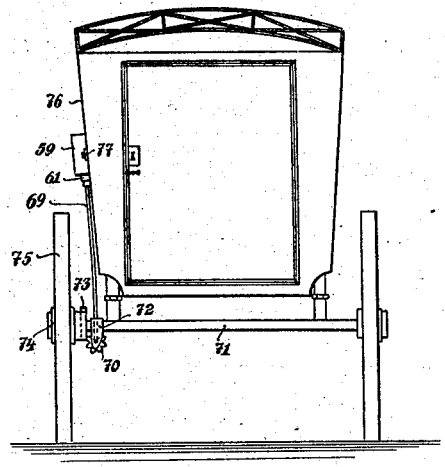
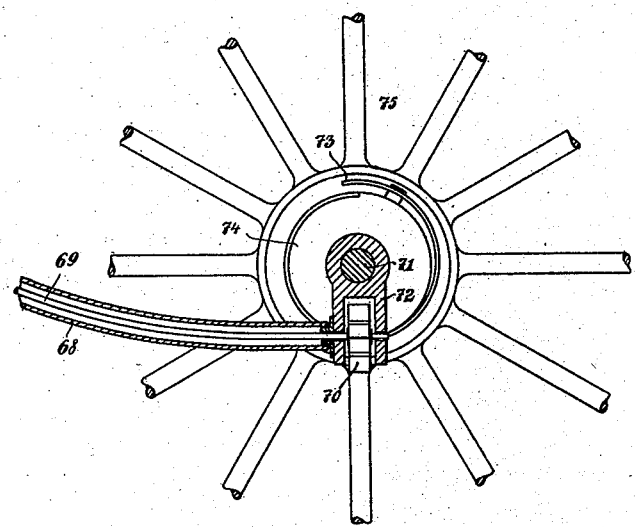
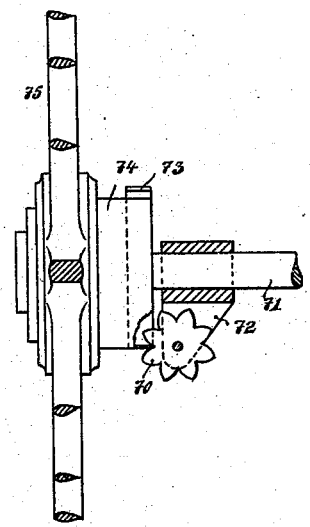

UNITED STATES PATENT OFFICE.

CARL FRANCKE AND HEINRICH SCHWABACHER, OF BERLIN, GERMANY.

SPEED RECORDER AND REGISTER FOR VEHICLES.

SPECIFICATION forming part of Letters Patent No. 693,793, dated February 18, 1902.

Application filed March 18, 1901. Serial No. 51,649. (No model.)

*To all whom it may concern:*

Be it known that we, CARL FRANCKE and HEINRICH SCHWABACHER, subjects of the Emperor of Germany, and residents of Dessauerstrasse 6, Berlin, in the Empire of Germany, have invented certain new and useful Improvements in Speed Recorders and Registers for Vehicles, of which the following is a full, clear, and exact specification.

The apparatus to which the present invention relates can be adapted to any kind of vehicle and answers a common requirement in a manner not hitherto achieved by supplying in a simple and accurate manner through the agency of the motion of the vehicle itself a record of the different stages and speeds of the journey which it is of importance for the owner of the vehicle to know.

As one example of many the use of the apparatus in connection with tram-cars may be mentioned. The apparatus will indicate the time at which the car left the station, the pace at which the car covered the various stages of the journey, the time at which the car arrived at the end of the journey, and whether the car stopped at the various stopping-places and at these only.

As a further example the use of the apparatus in connection with load-carrying vehicles may be mentioned. The apparatus will in this instance indicate the length of each journey made and the duration of same, and consequently the pace at which the journey is made and also the number and length of the stoppages. It can also be arranged that the apparatus will indicate the total of the various separate journeys made within a certain given period, and thus enables these to be controlled.

The apparatus is illustrated by the accompanying drawings, in which similar numerals denote similar parts.

Figure 1 is a front elevation of the apparatus inclosed in a box, partly shown in section and with the lid removed. Fig. 2 is a side view of Fig. 1, partly shown in section and the box being closed by the lid. Fig. 3 is a section on line A B of Fig. 1. Fig. 4 is an elevation of the front part of the apparatus with the dial and front plate removed. Fig. 5 is a rear view of the essential parts of the clockwork, of the distance-measuring device, and of the driving mechanism of the apparatus. Fig. 6 is a section on line C D of Fig. 4. Fig. 7 is a section on line E F of Fig. 4. Figs. 8, 9, 10, and 11 are detailed views of the box inclosing the apparatus. Fig. 12 is a rear view of a mail-cart which is provided with the apparatus. Fig. 13 is a sectional view of a part of the vehicle-wheel actuating the apparatus. Fig. 14 is a side view of Fig. 13.

The apparatus consists of a distance-measuring device which is operated by the rotation of the wheel and of a clockwork connected together in such a manner that a pencil operated by the road-measuring device registers the distance covered upon the revolving dial of the clockwork, the latter being set according to the hour at which the vehicle starts. The arrangement is such that after a certain distance—for instance, one kilometer—has been covered the pencil upon which a wheel with slanting teeth acts falls back, and this motion is registered upon the dial by a radial line. When the vehicle is standing still, the pencil, which is also at rest owing to the dial rotating, describes upon the same a part of a circular line, the length of which indicates the time and extent of the stoppage.

The total distance traversed, say, in a week by the vehicle can easily be ascertained by adding together the various distances registered each day upon the dial and can be further controlled by connecting the ratchet-wheel of the distance-registering apparatus acting upon the pencil with a kilometer-registering apparatus which automatically registers the total of the distances traversed.

The arrangement and action of the apparatus shown in the drawings are as follows: The distance-registering device arranged in the lower part of the apparatus is actuated by a worm 1, Fig. 5, being operated by a flexible axle from one vehicle-wheel, as hereinafter described. The worm 1 engages a worm-wheel 2, secured on a shaft 3, bearing a toothed wheel 4, which meshes with a toothed wheel 5 on the shaft 6. The latter bears a second toothed wheel 7, engaging a toothed wheel 8 on the shaft 9, on which a ratchet-wheel 10 with slanting teeth is secured. With the wheel 10 a lever 12 of the first class pivoted at 11 engages by means of a tooth 13 in such a manner that the rotary motion of the said wheel in direction of the arrow shown in Fig. 4 causes that arm of the lever 12 which carries the tooth 13 to rise and fall alternately, the said lever being under the influence of a spring 14 at its other end. The movement of the lever 12 is imparted on the one hand to a flat spring 15, pivoted at 47 on one of its ends and carrying a pencil or marker 16, and on the other hand to a pawl 18, attached to its other end and being under the influence of a spring 17. The pencil 16 marks its backward and forward movements upon the dial 19 of the clockwork hereinafter described, while the pawl 18 acts upon the ratchet-wheel 21 of the first disk 22 of the kilometer-registering apparatus, which, owing to the action of a spring-actuated pawl 20, cannot move backward. At each stroke of the pawl 18 the ratchet-wheel 21 moves on by one tooth and this movement is transmitted to the disks of the registering apparatus in the usual manner. The ratio of the gear-wheels connecting the worms 1 with the ratchet-wheel 10 of the distance-registering apparatus is such that in order to cause the said ratchet-wheel to revolve for the distance of one tooth a certain distance—say one kilometer—must be traversed. Each stroke of the pencil 16 then indicates the traversing of, say, one kilometer. As the dial 19 upon which the pencil 16 registers the distance is caused to revolve by means of an ordinary twelve-hour clockwork, it can be ascertained through the marks made by the pencil 16 upon the dial 19 how many kilometers were traversed in a given time and whether the vehicle made stoppages or not. The line marked by the pencil 16 for instance, in Fig. 1 shows that the vehicle provided with the apparatus began its journey at twelve o'clock, traversed somewhat more than four kilometers without interruption till 12.30 oclock, after this had a stoppage till 12.45, then traversed about five kilometers till 1.15 o'clock, hereafter stopped till 2.15 o'clock, &c.

The distance traversed by the vehicle during one day can be ascertained both by the marks on the dial 19 and by the kilometer-recorder. In order to ascertain by the latter the distance traversed during a certain period, it is of course necessary to deduct from the total indicated by the apparatus the number of kilometers indicated by it at the start, unless the apparatus is set back to zero at the start.

That part of the dial 19 upon which the marks are made is supported by a plate 23. The dial 19 is fixed by means of a screw-nut 24 or the like to the axle 25 of the clockwork and can be removed and replaced. The said axle 25, Figs. 4 to 7, is driven by a spring 27, which is wound up by a suitable device 26 in a well-known manner. The revolutions of the axle 30, with which the spring 27 is connected by means of a pawl 28 and ratchet-wheel 29, are transmitted by means of the gear-wheels 31 and 32 to the hollow axle 33, inclosing the axle 25, actuated by means of the gear-wheels 34 35 36 37, Fig. 6, in such a manner that the dial 19, supported by the axle 25, will complete one revolution in, say, twelve hours. The axle 33 of the clockwork is in connection with the gear-wheels 38 39 40 41 42 43 and regulated in the usual way by the anchor-escapement 44 45 and the balance-wheel 46 or by equivalent means.

In order to be able to use the same dial 19 both for the day and night, the said dial can be provided, as shown in Fig. 1, with an exterior and interior scale, for each of which a separate pencil 16 and 16', respectively, is provided. The two pencils 16 and 16', supported by the springs 15 and 15', can then be so arranged that one of them is in contact with the exterior scale or the other is in contact with the interior scale, as desired. The pencil 16 or 16' is secured in its writing position by means of a pin 48 on the lever 12, said pin engaging a hole in the spring 15 or 15', respectively. The pencils may further be arranged, one on either side of the same holder, in such a manner that one of them is in contact with the dial and the other not, or the pencil may be arranged to slide lengthwise of its holder 15. A special arrangement is made to prevent the premature wear and breaking of the said pencils and the inconvenience which would arise therefrom. This arrangement consists in employing a non-coloring pencil or style in connection with a writing-surface which yields color on pressure. As the point of the style, consisting, for instance, of metal, always retains its sharpness and always comes into contact with different parts of the writing-surface, exact register will be obtained even on vibrating surfaces, such as is the case in apparatus mounted upon vehicles, and reliable checking will be assured. The construction of this writing arrangement consists in the use of a specially-prepared writing-surface, such as paper with clay-surface, upon which a style consisting of silver, gold, aluminium, nickel, or the like produces distinct colored lines.

The parts of the apparatus as described—that is to say, the distance-measuring device and the clockwork and registering mechanism coöperating with same—are held by two side plates 50 and 51, connected by cross-bolts 49, Figs. 4 to 7, the plate 50 being attached to an inclined plate 52, which is secured to the inner side of the back 54 of the casing 55 by means of screws 53.

The upper front side of the casing 55, Fig. 1, is open in order to allow of the dial 19 being changed and the styles 16 and 16' being put in and out of action, while the kilometer-register located in its under portion is covered in front by a plate 56, through the openings 57 of which the position of the counter-disks can at any time be ascertained. On its under side the casing 55 is provided with two vertical pins 58, which engage in correspondingly-arranged holes 60 in the under portion 61 of the box 59 when the casing is placed in the latter, which is secured to the vehicle in the manner hereinafter described.

The worm 1 in the construction of the apparatus as shown is actuated as follows: A pivot 63, located in the bearings 62 of the under portion of the casing 55, is in engagement with the lower part of the worm 1 and is provided underneath with a square tapered socket 64, in which engages the upper square end 65 of a pivot 66, located in the lower portion 61 of the box 59. Joined to the lower portion 67 of the pivot 66 is a flexible shaft 69, inclosed in a tube 68, and leading to the vehicle-wheel, Figs. 12 to 14. The end of the flexible shaft 69 carries a ratchet-wheel 70, the wheel and shaft being held in a bearing 72, suspended from the axle 71. The ratchet-wheel 70 is actuated on each revolution of the wheel 75 in the usual way by a projecting rib 73 on the hub 74, and in this way the shaft 69 is also operated.

The apparatus as described is located in the box 59, fastened to the outer wall 76 of the vehicle, Fig. 12, by means of screws 77 in such a way that the same can be easily taken out of the box 59 at any time by the properly-authorized person and placed in said box again after having been checked. Access to the apparatus by unauthorized persons can then be prevented by a seal or a safety-lock. For this purpose the apparatus is placed in the box 59, open at its front, Fig. 1, and the box is then closed with a lid 78. The lid 78 is provided on both sides with pivots 79, on which the bow 80 is mounted. The inner side of the bow 80 is provided at its fulcrum with cams 81, engaging turnable hooks 82, which can be put in or out of engagement with the pins 83, attached to the box 59. The bow 80 also carries on its sides spring-arms 84, whose inwardly-directed pins 85 engage a notch of the hook 82, the bow being correspondingly turned. If it is desired to bring the bow 80 out of the closing position shown in Fig. 8, in which it lies on both sides against the stop 87 of the cover 78, into the opening position, it is turned in the direction of the arrow. Thereupon the hooks 82 are pushed forward somewhat by the action of the cams 81 and freed from the pins 83, Fig. 9. The hooks 82 are then turned upward by the noses 88 of the bow 80 meeting the stop-pins 89 of the hooks, Fig. 10, until said hooks arrive on the pins 90 of the cover 78, whereupon the cover can be removed from the box 59. In the opposite movement of the bow 80 the hooks 82 are moved with the same by the catches 85 of the spring-arms 84 engaging in the notches 86 and are then securely drawn into the closing position, Fig. 8, by the action of the cams 81. The cover 78 and the bow 80 are secured against unauthorized opening by means of a clamp-clover 91, Figs. 1 and 3, which is fastened to the box 59 by means of a hinge 92, and in fastening the cover 78 overlaps this latter by means of the hook-like catch 93. The outer holding end 94 is provided with a slot 95, in which engages a staple 96, secured to the box 59, and either a lock or a seal can be placed in said staple.

Of course the clockwork serving for actuating the registering device as well as the driving mechanism for the kilometer-register can be differently arranged and applied from the manner above described, and as illustrated in the accompanying drawings, without the scope of the present invention being affected thereby.

The fastening device for the apparatus can also be substituted by any other similar or equivalent means.

What we claim, and desire to secure by Letters Patent, is—

1. A speed recorder and register for vehicles, comprising a revoluble dial, a pivoted lever provided with a tooth on its under side, a marker carried by the free end of the lever and engaging the dial, a toothed wheel below the lever and with which the tooth of the lever engages, means for operating the toothed wheel from one of the movable parts of a vehicle, a distance-measuring device, and a pawl and ratchet for operating the measuring device from the said lever, as set forth.

2. A speed recorder and register for vehicles, comprising a revoluble dial, a pivoted and spring-pressed lever provided with a tooth on its under side, a marker carried by the free end of the lever, a toothed wheel below the lever and with which the tooth of the lever engages, means for operating the toothed wheel from a movable part of a vehicle, a distance-measuring device provided with a ratchet-wheel, and a pivoted and spring-pressed pawl carried by the end of the lever opposite that carrying the marker, and engaging the ratchet-wheel of the measuring device, as set forth.

3. In a speed recorder and register for tramway-cars and other vehicles, the combination with a dial having an exterior and an interior scale, of pencils adapted to come into contact with one or the other of said scales, substantially as hereinbefore described and for the purpose set forth.

4. A speed recorder and register for vehicles, comprising a movable registering-surface having a plurality of divisions or scales, means for driving said surface, a marking apparatus movable in a plane parallel with the registering-surface and adapted to be moved into engagement with either of said scales, and mechanism operated by one of the rotating parts of the vehicle for changing the position of the marker periodically within the division or scale with which it temporarily engages.

5. A speed recorder and register for vehicles, comprising a movable registering-surface having a plurality of divisions or scales, a marker in permanent engagement with the registering-surface and movable in a plane parallel with the same, mechanism for operating the said marker, and means operated by one of the rotating parts of the vehicle for actuating the marker-operating mechanism alternately in opposite directions every time the vehicle has run a predetermined distance.

6. In combination with a recorder and register of the type described, a device for detachably fastening same to the vehicle, consisting of a box with an open front and serving as holder for the apparatus, a lid adapted to cover said box, the turnable hooks of said lid being brought in and out of engagement with pins attached to the box by a swinging bow, the said lid being secured in its closed position by a clamp which overlaps the cover with a hook-like catch and which can be secured to the box by a seal, a lock or the like.

7. A speed recorder and register for vehicles, comprising a registering mechanism operated by a clockwork and by a rotating part of the vehicle, an open-front box in which said mechanism is contained, a lid for covering said box, pivoted hooks carried by the lid and adapted to lock it to the box, a swinging bow for operating said hooks, and a clamp for holding the bow and lid in the closing position.

CARL FRANCKE.
HEINRICH SCHWABACHER.

Witnesses:
HENRY HASPER,
WOLDEMAR HAUPT.